United States Patent
Kwon et al.

(10) Patent No.: US 9,014,271 B2
(45) Date of Patent: Apr. 21, 2015

(54) METHOD AND APPARATUS FOR REGION-BASED WEIGHTED PREDICTION WITH IMPROVED GLOBAL BRIGHTNESS DETECTION

(75) Inventors: Do-Kyoung Kwon, Allen, TX (US); Hyung Joon Kim, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 931 days.

(21) Appl. No.: 13/181,236

(22) Filed: Jul. 12, 2011

(65) Prior Publication Data

US 2012/0008691 A1  Jan. 12, 2012

Related U.S. Application Data

(60) Provisional application No. 61/363,454, filed on Jul. 12, 2010.

(51) Int. Cl.
| | |
|---|---|
| *H04N 19/573* | (2014.01) |
| *H04N 19/58* | (2014.01) |
| *H04N 19/527* | (2014.01) |
| *H04N 19/105* | (2014.01) |
| *H04N 19/46* | (2014.01) |
| *H04N 19/137* | (2014.01) |
| *H04N 19/51* | (2014.01) |
| *H04N 19/17* | (2014.01) |
| *H04N 19/23* | (2014.01) |

(Continued)

(52) U.S. Cl.
CPC ........... *H04N 19/573* (2014.11); *H04N 19/527* (2014.11); *H04N 19/103* (2014.11); *H04N 19/58* (2014.11); *H04N 19/517* (2014.11); *H04N 19/52* (2014.11); *H04N 19/23* (2014.11); *H04N 19/105* (2014.11); *H04N 19/46* (2014.11); *H04N 19/51* (2014.11); *H04N 19/137* (2014.11); *H04N 19/17* (2014.11)

(58) Field of Classification Search
CPC .................. H04N 19/00278; H04N 19/00569; H04N 19/00981; H04N 19/00696; H04N 19/00884; H04N 19/00684; H04N 19/00781; H04N 19/00024; H04N 19/00018; H04N 19/00551; H04N 19/00036; H04N 19/00175; H04N 19/00545; H04N 19/00733; H04N 19/527; H04N 19/51; H04N 19/517; H04N 19/523; H04N 19/105; H04N 19/23; H04N 19/58; H04N 19/573; G06T 5/007; G06T 5/009; G06T 5/20208
USPC ...................................................... 375/240.14
See application file for complete search history.

(56) References Cited

U.S. PATENT DOCUMENTS

| | | | |
|---|---|---|---|
| 7,577,198 B2* | 8/2009 | Holcomb | 375/240.13 |
| 7,978,920 B2* | 7/2011 | Okazaki et al. | 382/233 |

(Continued)

*Primary Examiner* — David N Werner
(74) *Attorney, Agent, or Firm* — Mima Abyad; Frank D. Cimino

(57) ABSTRACT

Described herein are a method and apparatus for determining a region-based weighted prediction with improved global brightness detection. The method includes applying a global brightness change detection methods by computing the weighted prediction parameters, determining if the brightness change is different amount of change for the different regions, if the change is not different, calculate motion estimation and setting reference index to 1 and setting reference index is set to zero when there is change, determining the best motion vector, motion vector cost and the best reference input, and determining a region-based weighted prediction with improved global brightness detection based on the motion vector data.

18 Claims, 1 Drawing Sheet

(51) Int. Cl.
*H04N 19/517* (2014.01)
*H04N 19/52* (2014.01)
*H04N 19/103* (2014.01)

(56) References Cited

U.S. PATENT DOCUMENTS

| | | | |
|---|---|---|---|
| 8,135,068 B1* | 3/2012 | Alvarez et al. | 375/240.16 |
| 8,284,837 B2* | 10/2012 | Yin et al. | 375/240.16 |
| 2004/0179620 A1* | 9/2004 | Foo et al. | 375/240.27 |
| 2004/0218676 A1* | 11/2004 | Ha et al. | 375/240.16 |
| 2005/0053143 A1* | 3/2005 | Holcomb et al. | 375/240.16 |
| 2005/0129117 A1* | 6/2005 | Jeon | 375/240.15 |
| 2006/0126962 A1* | 6/2006 | Sun | 382/268 |
| 2008/0240247 A1* | 10/2008 | Lee et al. | 375/240.16 |
| 2008/0253456 A1* | 10/2008 | Yin et al. | 375/240.16 |
| 2009/0290643 A1* | 11/2009 | Yang | 375/240.16 |
| 2010/0111183 A1* | 5/2010 | Jeon et al. | 375/240.16 |
| 2010/0232506 A1* | 9/2010 | Yin et al. | 375/240.16 |
| 2010/0266042 A1* | 10/2010 | Koo et al. | 375/240.16 |
| 2011/0235708 A1 | 9/2011 | Kim et al. | |

* cited by examiner

METHOD AND APPARATUS FOR REGION-BASED WEIGHTED PREDICTION WITH IMPROVED GLOBAL BRIGHTNESS DETECTION

CROSS-REFERENCE TO RELATED APPLICATIONS

This application claims benefit of U.S. provisional patent application Ser. No. 61/363,454, filed Jul. 12, 2010, which is herein incorporated by reference.

BACKGROUND OF THE INVENTION

1. Field of the Invention

Embodiments of the present invention generally relate to a method and apparatus for region-based weighted prediction; more specifically, to region-based weighted prediction with improved global brightness detection.

2. Description of the Related Art

Weighted prediction (WP) is introduced in H.264 video coding standard to improve coding efficiency for the video sequences that have brightness changes between frames. It is found to provide high coding efficiency for the video sequence with global brightness changes. However, since WP in H.264 is slice based method, it also leads to significant coding loss for the sequences that have lots of local brightness changes and high motions when it is applied without caution.

Some embodiments of global brightness change detection (GBD) method to apply WP when there are global brightness change between the current and the reference frames. Such embodiments are effective in not introducing coding loss for normal sequences while improving coding efficiency for the sequences with global brightness changes. However, such embodiments could be worse than applying WP always especially when there are local brightness changes.

Therefore, there is a need for a region-based weighted prediction with improved global brightness detection.

SUMMARY OF THE INVENTION

Embodiments of the present invention relate to a method and apparatus for determining a region-based weighted prediction with improved global brightness detection. The method includes applying a global brightness change detection methods by computing the weighted prediction parameters, determining if the brightness change is different amount of change for the different regions, if the change is not different, calculate motion estimation and setting Refidx to 1 and setting Refidx is set to 0 when there is change, determining the best motion vector, motion vector cost and the best reference input.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
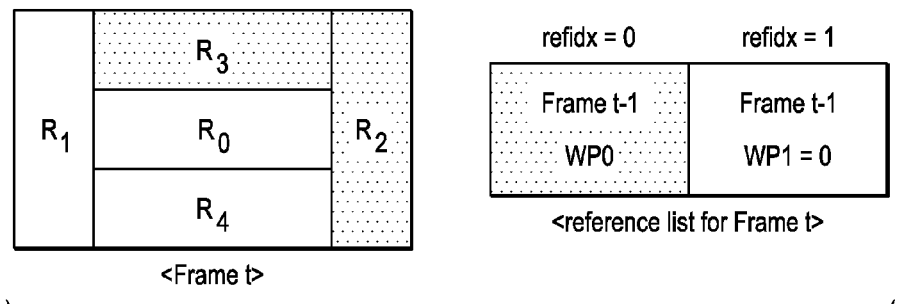
FIG. 1 is an embodiment of a local brightness changes and association to reference index.

A region based WP method to handle local brightness change as well as improved GBD method is proposed. First, improved GBD is employed to determine if there is local brightness change and to identify such regions. Once local brightness changes are found, region based WP is applied using reference picture reordering to efficiently handle such regions. Then, motion estimation (ME) for each block is performed over one reference index (frame) depending on whether the region, in which the block is located, has brightness change or not.

Such a solution is useful when there are strict limitations on resources, such as, cycle count, memory bandwidth, etc. In the current hardware implementation of H.264 encoder, a single reference is used for ME due to such resource constraints. Since one reference is loaded and one ME per block is needed, no additional computations and memory bandwidth for ME are needed.

H.264 supports reference picture reordering by which the reference pictures in decoded picture buffer (DPB) could be reordered if necessary to improve coding efficiency. It is even possible that the same reference picture is placed in multiple reference indices. It is worth noting that each reference picture may have its own WP parameters in H.264. Using these two H.264 features, the effective region may be based on a WP method. One may assume that frame picture encoding with a single reference frame and each frame consist of a single slice.

To improved global brightness change detection, one may divide the current frame and the reference frame into the same arbitrary N regions of any size and shapes. Then, apply the global brightness change detection by which we can also identify the regions that have brightness changes can be identified by: (1) calculating the mean pixel values and variances of the n-th region of current picture and reference picture, where they are denote by $m_{cur}(n)$, $m_{ref}(n)$, $v_{cur}(n)$ and $v_{ref}(n)$, respectively. Then, the absolute difference is calculated between the two mean values, $m_{diff}(n)=|m_{cur}(n)-m_{ref}(n)|$; and then (2) comparing the absolute mean difference, $m_{diff}(n)$, to a predefined threshold, TH. If $m_{diff}(n)$ is larger than TH, then increase the number of regions that have brightness change, Rcount, by 1. These steps may be repeated for a specific number or type of regions or for all regions; and (3) checking if either $v_{cur}(n)-v_{ref}(n)>=0$ or $v_{cur}(n)-v_{ref}(n)<=0$ for all N regions. Based on the observation that, with fade-in and fade-out, the variances of all regions either increase (fade-in) or decrease (fade-out), if the mean pixel values changes are determined to be caused by fade-in/fade-out, then set Fade=1. Where if the Fade is set to 1 and Rcount is larger than or equal to $N_{max}$ ($N_{min}<N_{max}<=N$), we compute WP parameters, associate them to refidx, a reference index, equal to 0 and encode all MBs with motion estimation (ME) using refidx equal to 0. Otherwise, if Fade=0 or Rcount is less than or equal to $N_{min}$, we turn off WP and encode all MBs with ME using refidx equal to 0.

In the region-based weighted prediction, if the fade is set to 1 and $N_{min}<Rcount<N_{max}$, the reference frame is reordered in order for the same reference frames to sit in two places, refidx=0 and refidx=1, respectively. In such a case, WP parameters are computed and associated to refidx equal to 0 and zero WP parameters are associated to refIdx equal to 1. The encoder may send reference reordering syntaxes for decoders. However, when encoding each MB, if the MB is in the region with brightness change, ME is performed with refidx equal to 0. However, if the MB is in the regions without brightness change, ME is performed with refidx equal to 1. In one embodiment, if 2 reference frames are used without global brightness change, coding gains are lost due to the increased overhead bits to encode reference index. Such losses are very noticeable with normal sequences that have no fade-in, fade-out and brightness changes.

In one embodiment, one may consider the percentage of regions with brightness change for it. For example, the number of regions with brightness change is smaller than the other, zero WP may be associated with refidx=0. This is important because it affects the number of skipped blocks, whose refidx should be 0.

FIG. 1 is an embodiment of a local brightness changes and association to reference index. In FIG. 1, the frames are divided into 5 rectangular regions; two of frames include luminance change (gray regions) and the others do not (white regions). In such a case, the reference list is reordered to put the same reference frame (frame t−1) into refidx=1 as well. Then, the computed WP parameters (WP0) is associated with refidx=0 and zero WP parameters (WP1) with refidx=1. Then we perform ME using refidx=0 for MBs in the gray regions and refidx=1 for MBs in the white regions.

Figure 2:
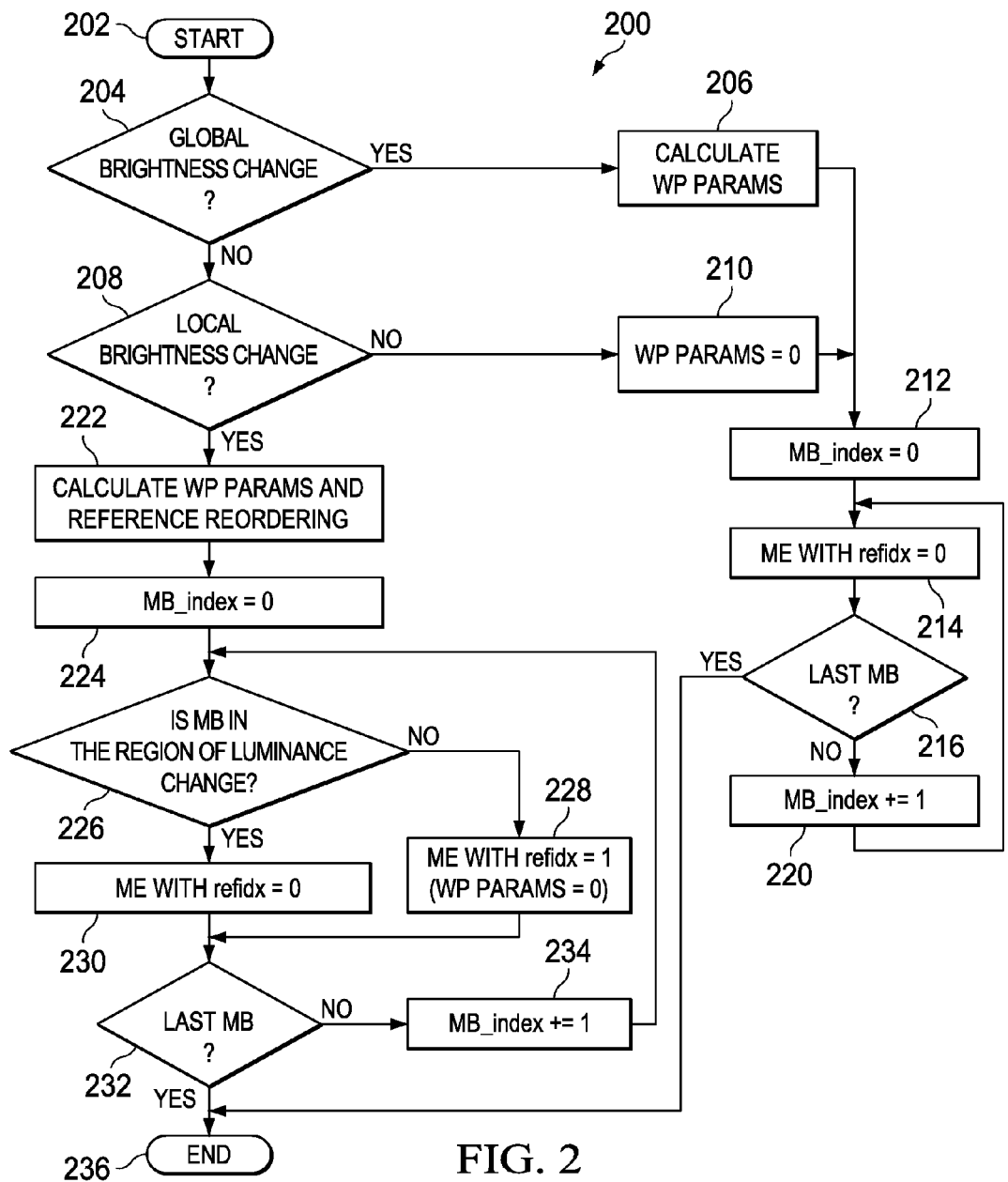
FIG. 2 is an embodiment of a flow diagram depicting a method for region-based weighted prediction with improved global brightness detection.

FIG. 2 is an embodiment of a flow diagram depicting a method 200 for region-based weighted prediction with improved global brightness detection. The method starts at step 202 and continues to step 204. At step 204, the method 200 determines if a change in global brightness was detected. If a change was detected, the method 200 proceeds to step 206, wherein weighted prediction parameters are calculated. Otherwise, the method 200 proceeds to step 208, wherein the method 200 determines local brightness has changed. If there is no change, the method 200 proceeds to step 210, wherein the weighted prediction parameters are set to zero (0). Otherwise, the method 200 proceeds to step 222.

From steps 206 and 210, the method 200 proceeds to step 212, wherein the method 200 sets micro block index to zero (0) and proceeds to step 214. At step 214, the method 200 sets motion estimation with refIdx to zero (0). At step 216, the method 200 determines if it is the last micro block. If it is not the last block, the method 200 proceeds to step 220 and sets micro block in increased by one (1). The method 200 proceeds from step 220 to step 214. From step 208, if the local brightness changed, the method 200 proceeds to step 222. At step 222, the method 200 calculates the weighted prediction parameters and reference re-ordering. At step 224, the method 200 step the micro block index to zero (0). At step 226, the method 200 determines if the micro block is in the region of luminance change. It is in the region, the method proceeds to step 230. At step 230, the method 200 calculates motion estimation with refidx set to zero (0). Otherwise, the method proceeds from step 226 to step 228, wherein the method 200 calculates motion estimation with refidx set to one (1) and weighted prediction parameters set to zero (0).

From steps 228 and 230, the method 200 proceeds to step 232, wherein the method 200 determines if it is the last micro block. If it is not the last micro block, the method 200 proceeds to step 234, wherein the micro block index is incremented by one (1). From step 234, the method 200 returns to step 226. Otherwise, the method 200 proceeds from step 232 to step 236. The method 200 ends at step 236.

To compute weighted prediction (WP) parameters, various method and different regions may be considered for weighted prediction parameter calculation, such as, regions where brightness have changed or all regions regardless of how brightness changes locally. In one embodiment, N reference indices may use reference picture reordering and associate N different WP parameters to each of N regions. Then, for each block, the corresponding reference index for motion estimation may be chosen according to its position. When a single block overlaps multiple regions, there are several criteria to decide which region the block is included in. In the current embodiment, we used top-left block position for the decision. Thus, in this case, the block is in the region where top-left pixel of the block is included.

The region-based WP can be extended to block based or macro-block (MB) based weighted prediction with marginal computation increase, but without any increase of memory bandwidth. In another embodiment, macro-block based weighted prediction are calculated with marginal computation increase, but without any increase of memory bandwidth. Thus, global brightness change detection is improved. Improving global brightness change detection (GBD) in order to produce a more accurate decision. If there is no brightness change or global brightness change, on/off weighted prediction switch is switched globally. If we detect local brightness change, we apply weighted prediction with reference list reordering to put the same reference in multiple reference list. With reference reordering, both region-based WP and MB-based weighted prediction are enabled.

As a result, the quality loss by improved GBD method is minimized. The improved GBD is also critical to region-based WP. By careful decision on the use of region-based WP, the coding gain is maximized by region-based WP and the overhead bits to encoder reference index is minimized. The proposed MB-based WP with best MV cost check requires motion estimation only with 1 reference for each block, but have the similar performance with microblock based WP with motion estimation with 2 references. Hence, better quality is achieved with marginal increase of computational complexity.

MB-based WP with final MV cost check: If Fade=1 and $N_{min}$<Rcount<$N_{max}$, we reorder the reference frame so that the same reference frames sits in two places, refidx=0 and refidx=1, respectively.

WP parameters are calculated and associated to refidx equal to 0 and associate zero WP parameters to refidx equal to 1. The encoder should send reference reordering syntaxes for decoders. When encoding each MB, motion estimation with zero WP parameters (refidx=1) are calculated first and get the best MV and its MV cost, which are denoted by $MV_1$ and $MVCost_1$. Then, for $MV_1$, MV cost w.r.t. non-zero WP parameters (refidx=0) are calculated (denoted by $MV_0$ and $MVCost_0$). Decide the best reference index by comparing $MVCost_1$ and $MVCost_0$.

In the above algorithm, this is an issue on which reference index we will use for motion estimation. Motion estimation gets better when the actual content is not hampered by brightness change. Based on this fact, we can do motion estimation with non-zero WP in case of fade-in (i.e. $v_{cur}(n)-v_{ref}(n)>=0$). The above MB-based WP can be modified to use 2 references for motion estimation instead of final MV cost check. It is supposed to show the best performance. But the computational complexity will increase. We use this 2-ref MB-based WP as bench mark to evaluate the region-based WP and the (1-ref) MB-based WP with final MV cost check.

While the foregoing is directed to embodiments of the present invention, other and further embodiments of the invention may be devised without departing from the basic scope thereof, and the scope thereof is determined by the claims that follow.

What is claimed is:

1. A method of a digital processor for determining a region-based weighted prediction with improved global brightness detection, the method comprising:
  applying a global brightness change detection method by computing the weighted prediction parameters;
  determining if the brightness change is a different amount of change for the different regions;
  if the change is not different, calculate motion estimation and setting reference index to 1 and setting reference index to zero when there is change;
  determining the best motion vector, motion vector cost and the best reference input; and
  determining a region-based weighted prediction with improved global brightness detection based on the motion vector data.

2. The method of claim 1, wherein the method utilizes two reference frames without global brightness change.

3. The method of claim 1, wherein the method considers at least one of the regions where brightness has changed or considers all regions for simplicity.

4. The method of claim 1, wherein N reference indices use reference picture reordering and associate N different weighted prediction parameters to each of N regions.

5. The method of claim 4, wherein for each MB the corresponding reference index for ME according to its position is considered.

6. The method of claim 1, wherein a MB is decided to be in the region where top-left pixel of the MB is considered.

7. An apparatus for determining a region-based weighted prediction with improved global brightness detection, the apparatus comprising:
  means for applying a global brightness change detection method by computing the weighted prediction parameters;
  means for determining if the brightness change is a different amount of change for the different regions;
  if the change is not different, means for calculating motion estimation and means for setting reference index to 1 and setting reference index to zero when there is change;
  means for determining the best motion vector, motion vector cost and the best reference input; and
  means for determining a region-based weighted prediction with improved global brightness detection based on the motion vector data.

8. The apparatus of claim 7, wherein the method utilizes two reference frames without global brightness change.

9. The apparatus of claim 7, wherein the method considers at least one of the regions where brightness has changed or considers all regions for simplicity.

10. The apparatus of claim 7, wherein N reference indices use reference picture reordering and associate N different weighted prediction parameters to each of N regions.

11. The apparatus of claim 10, wherein for each MB the corresponding reference index for ME according to its position is considered.

12. The apparatus of claim 7, wherein a MB is decided to be in the region where top-left pixel of the MB is considered.

13. A non-transitory computer readable medium with computer instructions, when executed perform a method for determining a region-based weighted prediction with improved global brightness detection, the method comprising:
  applying a global brightness change detection method by computing the weighted prediction parameters;
  determining if the brightness change is a different amount of change for the different regions;
  if the change is not different, calculate motion estimation and setting reference index to 1 and setting reference index to zero when there is change;
  determining the best motion vector, motion vector cost and the best reference input; and
  determining a region-based weighted prediction with improved global brightness detection based on the motion vector data.

14. The non-transitory computer readable medium of claim 13, wherein the method utilizes two reference frames without global brightness change.

15. The non-transitory computer readable medium of claim 13, wherein the method considers at least one of the regions where brightness has changed or considers all regions for simplicity.

16. The non-transitory computer readable medium of claim 13, wherein N reference indices use reference picture reordering and associate N different weighted prediction parameters to each of N regions.

17. The non-transitory computer readable medium of claim 14, wherein for each MB the corresponding reference index for ME according to its position is considered.

18. The non-transitory computer readable medium of claim 13, wherein a MB is decided to be in the region where top-left pixel of the MB is considered.

* * * * *